(12) United States Patent
Kimberly et al.

(10) Patent No.: US 9,336,187 B2
(45) Date of Patent: May 10, 2016

(54) MEDIATION COMPUTING DEVICE AND ASSOCIATED METHOD FOR GENERATING SEMANTIC TAGS

(75) Inventors: Greg A. Kimberly, Seattle, WA (US); Harshpreet S. Walia, Bellingham, WA (US)

(73) Assignee: The Boeing Company, Chicago, IL (US)

( * ) Notice: Subject to any disclaimer, the term of this patent is extended or adjusted under 35 U.S.C. 154(b) by 684 days.

(21) Appl. No.: 13/470,754

(22) Filed: May 14, 2012

(65) Prior Publication Data

US 2013/0304454 A1 Nov. 14, 2013

(51) Int. Cl.
G06F 17/27 (2006.01)
G06F 17/30 (2006.01)
G06F 17/21 (2006.01)
G06Q 50/00 (2012.01)
G06Q 10/10 (2012.01)
G06Q 10/00 (2012.01)

(52) U.S. Cl.
CPC .......... *G06F 17/218* (2013.01); *G06F 17/2785* (2013.01); *G06Q 10/107* (2013.01); *G06Q 10/20* (2013.01); *G06Q 50/01* (2013.01)

(58) Field of Classification Search
USPC .............................................................. 704/9
See application file for complete search history.

(56) References Cited

U.S. PATENT DOCUMENTS

| | | | |
|---|---|---|---|
| 4,156,797 A | 5/1979 | Hoole | |
| 5,274,739 A | 12/1993 | Woodard | |
| 6,233,558 B1 | 5/2001 | Whalley | |
| 6,317,708 B1 * | 11/2001 | Witbrock et al. | 704/9 |
| 6,356,864 B1 * | 3/2002 | Foltz et al. | 704/1 |
| 6,718,297 B1 | 4/2004 | Pride, III et al. | |
| 7,577,654 B2 | 8/2009 | Brants et al. | |
| 7,610,547 B2 | 10/2009 | Wang et al. | |
| 8,185,609 B2 | 5/2012 | Fuchs et al. | |
| 8,311,797 B2 | 11/2012 | Beck et al. | |
| 8,311,827 B2 | 11/2012 | Hernandez et al. | |
| 8,392,194 B2 | 3/2013 | Agarwal | |
| 8,401,837 B2 | 3/2013 | Coen | |
| 8,442,751 B2 | 5/2013 | Kimberly et al. | |
| 8,600,761 B2 | 12/2013 | Marsh et al. | |
| 8,838,445 B1 | 9/2014 | Bultemeier | |
| 2002/0111720 A1 * | 8/2002 | Holst et al. | 701/3 |
| 2005/0228674 A1 | 10/2005 | Gunn et al. | |
| 2005/0283369 A1 | 12/2005 | Clausner et al. | |

(Continued)

OTHER PUBLICATIONS

International Search Report and Written Opinion from International Application No. PCT/US2013/26118 mailed Dec. 9, 2014.

*Primary Examiner* — Timothy Nguyen
(74) *Attorney, Agent, or Firm* — Alston & Bird LLP

(57) ABSTRACT

A computing device, computer system and associated method are provided to mediate a conversation in a manner that facilitates the inclusion of semantic tags within the conversation. In the context of a method, user input may be received relating to maintenance of a system. The method also determines, with processing circuitry, a candidate tag based upon semantic context of the user input. Additionally, the method provides an indication of the candidate tag to the user and receives a response from the user regarding validity of the candidate tag with respect to the semantic context of the user input. The method may also store the maintenance report including the user input and an associated tag. A corresponding mediation computing device and an associated computer system are also provided.

23 Claims, 3 Drawing Sheets

(56) References Cited

U.S. PATENT DOCUMENTS

| | | |
|---|---|---|
| 2006/0020456 A1 | 1/2006 | Rassaian et al. |
| 2006/0074980 A1* | 4/2006 | Sarkar .................. 707/104.1 |
| 2007/0083300 A1* | 4/2007 | Mukheriee .................. 701/3 |
| 2009/0083034 A1* | 3/2009 | Hernandez et al. ........... 704/251 |
| 2009/0138516 A1* | 5/2009 | Young et al. ............... 707/104.1 |
| 2009/0138871 A1 | 5/2009 | Kimberly et al. |
| 2009/0138872 A1* | 5/2009 | Fuchs et al. .................. 717/173 |
| 2009/0138873 A1* | 5/2009 | Beck et al. .................. 717/173 |
| 2009/0138874 A1* | 5/2009 | Beck et al. .................. 717/173 |
| 2011/0295595 A1* | 12/2011 | Cao et al. .................. 704/9 |
| 2012/0078613 A1* | 3/2012 | Kandekar et al. ............ 704/9 |
| 2012/0101806 A1* | 4/2012 | Davis et al. ................ 704/9 |
| 2012/0303352 A1 | 11/2012 | Coen et al. |
| 2013/0006610 A1 | 1/2013 | Quadracci et al. |
| 2013/0246574 A1 | 9/2013 | Kimberly et al. |

* cited by examiner

MEDIATION COMPUTING DEVICE AND ASSOCIATED METHOD FOR GENERATING SEMANTIC TAGS

TECHNOLOGICAL FIELD

In accordance with an example embodiment, a technique is provided for the generation of semantic tags and, more particularly, to the generation of maintenance reports that include semantic tags.

BACKGROUND

Users engage in a variety of computer mediated communications. For example, users may engage in a conversation involving the repeated exchange of messages, such as email messages, text messages or the like. Although computer mediated communications may be performed for various purposes, computer mediated communications may be utilized in conjunction with the generation of maintenance reports, such as by the exchange of electronic communication between a person describing a particular issue and requesting maintenance to resolve the particular issue and another person, such as a maintenance technician, who responded to the request and is reporting upon the actions taken in order to resolve the issue.

Computer mediated communication generally has two distinct audiences. The primary audience is the person who is the ostensible target of the communications, while the secondary audience is the ancillary computer systems that may analyze, review or otherwise attempt to add value to the communications at some later point in time. For example, ancillary computer systems may include search engines and/or business process analysis engines that review the prior communication. Since the communications are intended to satisfy the requirements of the primary audience, the communications are generally written with the requirements of the primary audience in mind. As such, the secondary audience may have difficulty in subsequently interpreting the semantics associated with the communications since the secondary audience was not involved in the initial communications and may not appreciate the context of the communications.

Although a variety of inference techniques have been developed in an effort to facilitate the interpretation of the semantics associated with a prior computer mediated communication, the various inference techniques have not generally proven to be entirely successful. In order to have a better appreciation for the semantics associated with a prior computer mediated communication, efforts have been advanced by ancillary computer systems to have the creators of the communications explicitly tag the messages with semantic labels or tags during the creation of the messages. These semantic labels can then assist the secondary audience with the semantic interpretation of the communications. However, the creators of the communications have not generally utilized semantic labels, at least not in any consistent fashion, likely because creators of the communication are much more concerned with the needs of the primary audience for the communications, as opposed to the interests of a secondary audience.

Users of the Twitter™ social networking service, however, have made widespread use of hash tags in their communications. While the use of such hash tags is different than the general failure of the creators of other types of computer mediated communications to utilize semantic tags, it is noted that the hash tags utilized by Twitter™ users is embedded directly into the communication messages such that the Twitter™ users view hash tags as an integral portion of the message for their audience, as opposed to a separate and additional requirement that has no value to the primary audience. Additionally, Twitter™ users view hash tags as a shorthand technique so as to reduce the typing that is required during the creation of a Twitter™ message without compromising the contend of the Twitter™ message. Such savings are of particular importance in conjunction with the Twitter™ communications environment in which the messages have a limited length. Notwithstanding the prevalence of hash tags in Twitter™ messages, other computer mediated communications in which semantic tagging has less or no value to the primary audience has not been able to convince the creators of the messages to semantically tag their messages in a consistent manner, even though such semantic tagging would benefit the subsequent analysis of the communications by ancillary computer systems.

BRIEF SUMMARY

A computing device, computer system and associated method are provided in accordance with an example embodiment of the present disclosure in order to mediate a conversation in a manner that facilitates the inclusion of semantic tags within the conversation. As such, the conversation which may result, for example, in the generation of a maintenance report, may be subsequently reviewed by an ancillary computing device in a manner that allows the ancillary computing device to have an improved contextualizaton for the semantic context at the time at which the computer mediated conversation was conducted. Additionally, the computing device, computer system and associated method of an example embodiment may facilitate the inclusion of tags relating to the semantic context in a manner that is straight forward and efficient for the user, thereby increasing the likelihood that the user will take advantage of the semantic tagging of the messages that comprise the conversation.

In one embodiment, a method of generating maintenance reports is provided that includes receiving user input relating to maintenance of a system. The method also determining, with processing circuitry, a candidate tag based upon semantic context of the user input. Additionally, the method provides an indication of the candidate tag to the user and receives a response from the user regarding validity of the candidate tag with respect to the semantic context of the user input. In one embodiment, the method also stores the maintenance report including the user input and an associated tag.

The method of one embodiment determines the candidate tag by determining the candidate tag based upon a domain within which the user input is provided. In one embodiment in which the user input is part of an ongoing conversation, the method determines the candidate tag by determining the candidate tag based upon the semantic context of the ongoing conversation. The indication of the candidate tag may be provided to the user while composing a message that includes the user input. In one embodiment in which user input is received indicating commencement of tagging by the user, the determination of the candidate tag and the provision of the indication of the candidate tag are performed in response to the commencement of tagging by the user. In this embodiment, the determination of the candidate tag includes completing the tagging commenced by the user.

In another embodiment, a computing device configured to generate maintenance reports is provided that includes an interface configured to receive user input relating to maintenance of a system. The computing device also includes processing circuitry configured to determine a candidate tag based upon semantic context of the user input. The interface is further configured to provide an indication of the candidate tag to the user and to receive a response from the user regarding validity of the candidate tag with respect to the semantic context of the user input. The computing device may also include a memory device configured to store the maintenance report including the user input and an associated tag.

The processing circuitry may be configured to determine the candidate tag by determining the candidate tag based upon a domain within which the user input is provided. In an embodiment in which the user input is part of an ongoing conversation, the processing circuitry is configured to determine the candidate tag by determining the candidate tag based upon the semantic context of the ongoing conversation. In one embodiment, the interface is configured to provide the indication of the candidate tag to the user while the user is composing a message that includes the user input. In an embodiment in which the interface is configured to receive user input by receiving user input indicating commencement of tagging by the user, the processing circuitry is configured to determine the candidate tag and the interface is configured to provide the indication of the candidate tag in response to the commencement of tagging by the user. In this regard, the processing circuitry may be configured to determine the candidate tag by completing the tagging commenced by the user.

In a further embodiment, a computer system is provided that includes a mediation computing device configured to mediate a conversation comprised of a plurality of messages. In one embodiment, the conversation comprises a maintenance report. The mediation computing device is configured to receive user input comprising at least a portion of a message of the conversation, determine a candidate tag based upon semantic context of the user input, provide an indication of the candidate tag to the user and receive a response from the user regarding validity of the candidate tag with respect to the semantic context of the user input. The computer system also includes an ancillary computing device, such as a search engine or a business process analysis engine, configured to review the conversation following completion of the conversation.

The computer system may also include a memory device configured to store the conversation including the plurality of messages and respective tags associated therewith. In this embodiment, the ancillary computing device is configured to review the conversation stored by the memory device. The mediation computing device may be configured to determine the candidate tag by determining the candidate tag based upon a domain within which the user input is provided. In one embodiment the mediation computing device is configured to provide the indication of the candidate tag to the user while the user is composing the message that includes the user input.

BRIEF DESCRIPTION OF THE DRAWINGS

Figure 1:
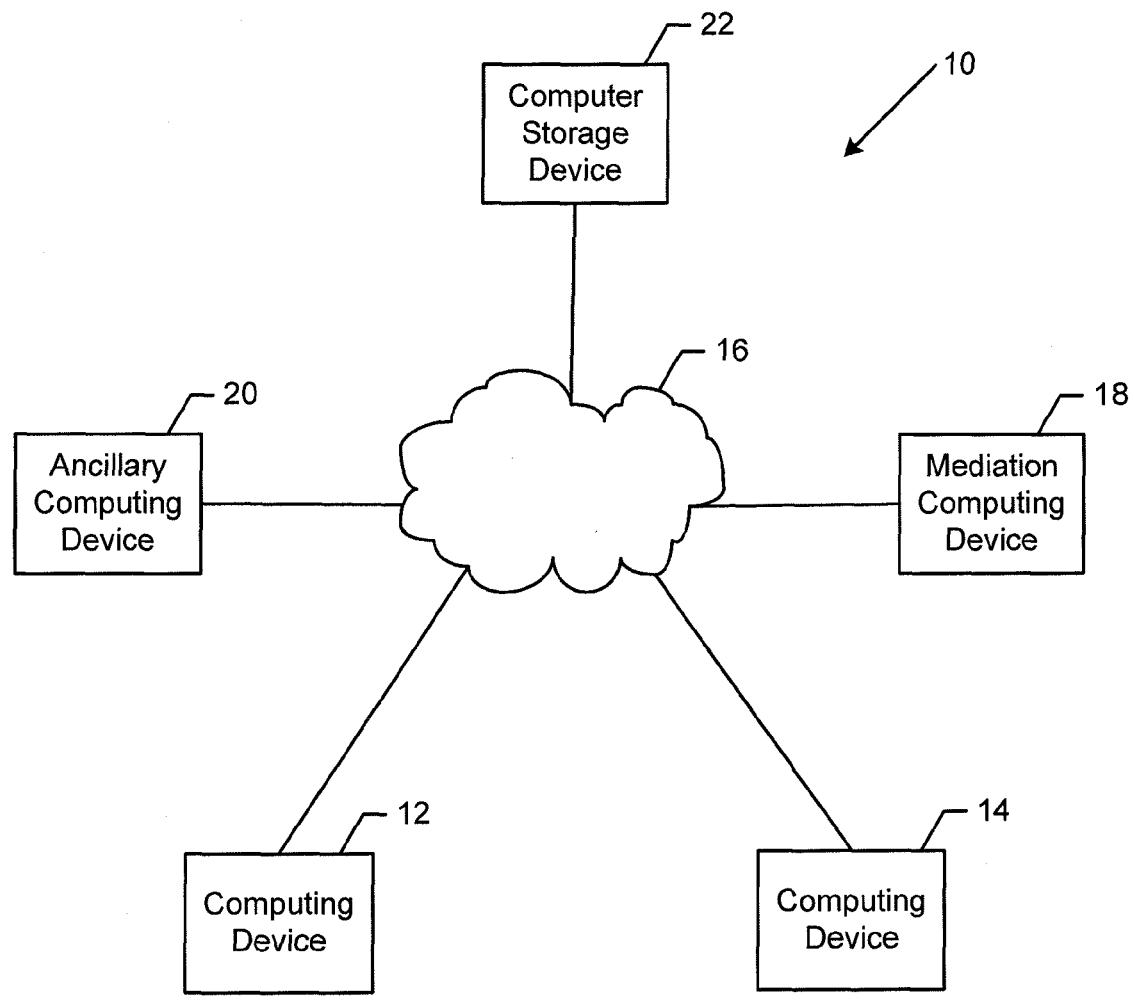
Figure 2:
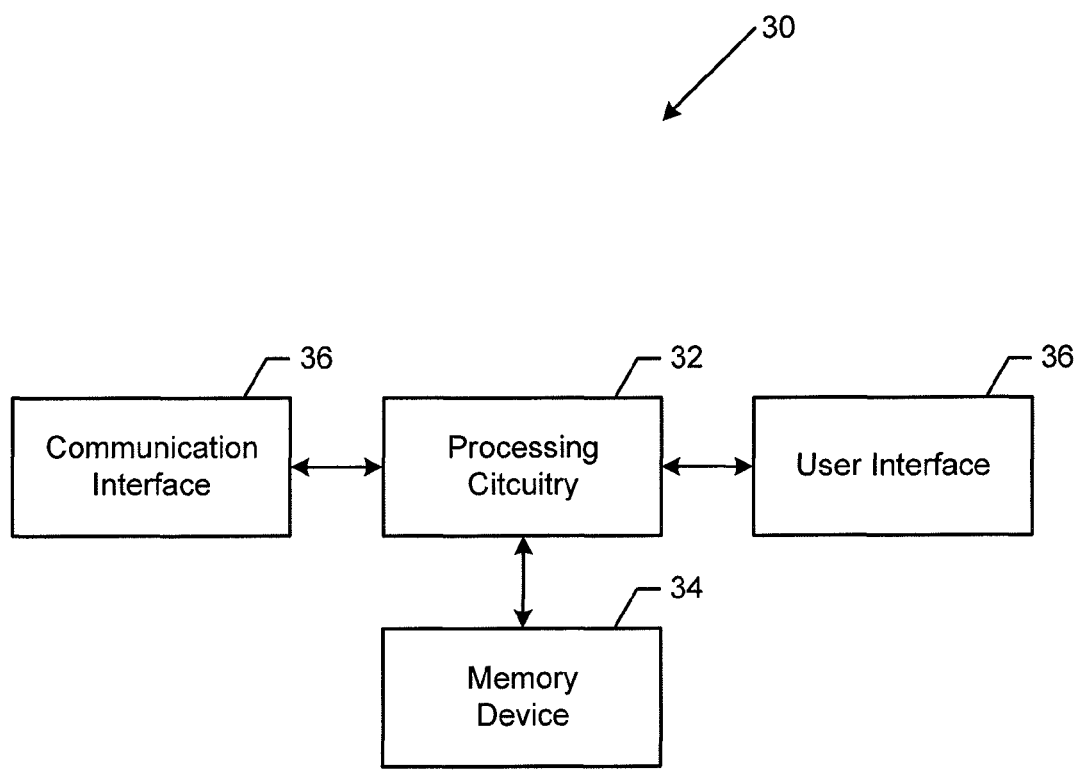
Figure 3:
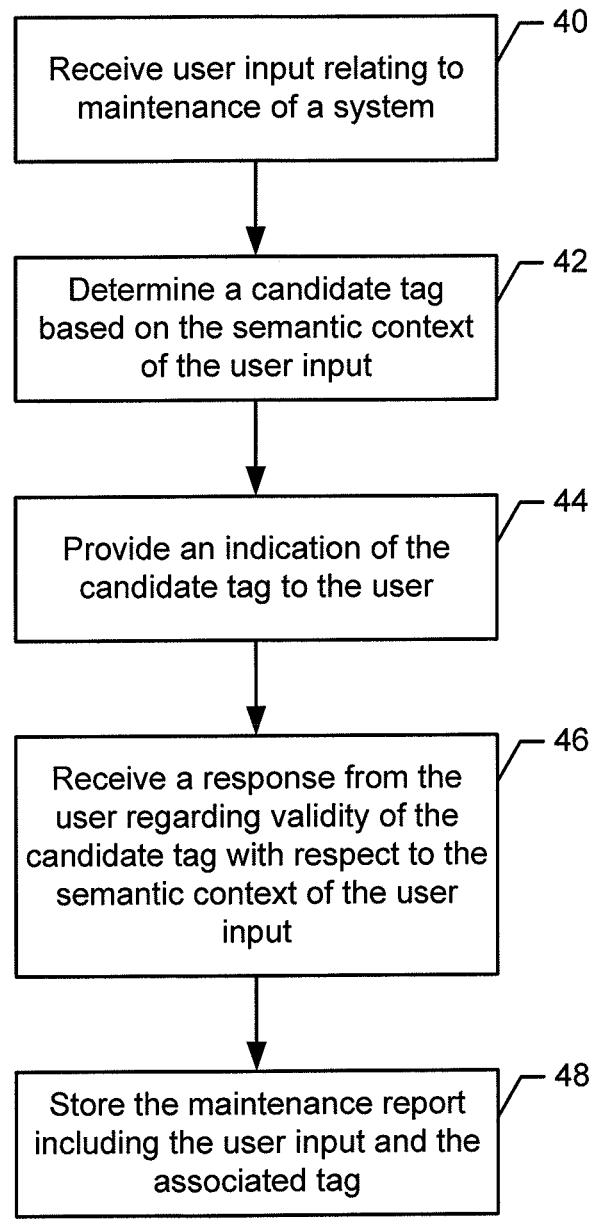

Having thus described certain example embodiments of the present disclosure in general terms, reference will now be made to the accompanying drawings, which are not necessarily drawn to scale, and wherein:

FIG. 1 is a schematic representation of the computing devices involved in a computer mediated conversation as well as an ancillary computing device for subsequently analyzing the resulting conversation in accordance with an example embodiment of the present disclosure;

FIG. 2 is a block diagram of an apparatus that may be embodied by a mediation computing device in accordance with an example embodiment of the present disclosure; and FIG. 3 is a flowchart illustrating operations performed in accordance with an example embodiment of the present disclosure.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Referring now to the FIG. 1, a computer system 10 in accordance with an example embodiment as illustrated. In the illustrated embodiment, the users of two or more computing devices 12, 14 may be engaged in computer mediated conversation. Each user may utilize a computing device 12, 14, such as a computer workstation, a desktop computer, a laptop computer, a tablet computer, a mobile telephone, a personal digital assistant (PDA) or other type of computing device, in order to create messages that are exchanged with the computing device of the other user as part of a conversation. Although the exchange of the messages may be supported in various manners, the computing devices 12, 14 may be interconnected by a network 16, such as a wireline network, a wireless network or the like.

Such a conversation may be performed in various contexts including, for example, during the generation of a maintenance report in which one of the users creates a message reporting an issue for which maintenance is required. This message reporting the issue may include a variety of information including the identification of a particular piece of equipment and the symptoms and/or performance characteristics exhibited by the equipment that led the user to determine that maintenance may be required. In this scenario, another user may be responsible for the maintenance of the piece of equipment and may provide messages relating to the maintenance operations that were performed including the action taken and the timing of such actions. In some instances, other users may be involved in the conversation including a user responsible for the scheduling of maintenance operations, one or more additional maintenance technicians that may need to be called in in order to address particular issues, suppliers of parts that are required for the repair or the like. The resulting conversation comprised of the messages exchanged by the computing devices of the users (two of which are shown by way of example, but not of limitation in FIG. 1) may create a maintenance report. In this example in which the conversation results in the generation of a maintenance report, the computing devices of the user may be maintenance computers, such as portable maintenance computers, an aircraft computer, such as an electronic flight bag, or the like.

The conversation between the users may be computer mediated in that the messages that comprise the conversation, e.g., the maintenance report, are exchanged between two or more computing devices 12, 14 and a mediation computing device 18 may monitor or otherwise have access to the messages exchanged by the computing device and, as described below, may provide feedback to one or more of the users during the conversation, such as during the generation of a message by one or more of the users. Although the mediation computing device 18 may be one of the computing devices 12, 14 that is engaged in the conversation, the mediation computing device is generally distinct from the computing devices that are engaged in the conversation and, as such, does not typically provide messages that are included within the conversation between the users.

As described below, the mediation computing device 18 may review the user input that a user provides during the creation of a message and may suggest a candidate tag based upon the semantic context of the user input, as determined by the mediation computing device. The user may then accept the candidate tag for inclusion in the message or may correct the candidate tag in an instance in which the candidate tag suggested by the mediation computing device 18 is inaccurate with respect to the semantic context of the user input. In either instance, the resulting message may include a semantic tag, thereby facilitating subsequent understanding of the semantic context at the time of the creation of the message. In this regard, the computer system 10 of the embodiment of FIG. 1 may also include an ancillary computing device 20, such as a search engine, a business process analysis engine or the like, configured to review the conversation previously conducted between the users following completion of the conversation. In this regard, the inclusion of the semantic tags within the messages that comprise the conversation facilitate the understanding by the ancillary computing device 20 of the semantic context at the time at which the messages that comprise the conversation were created. Thus, the analysis of the conversation by the ancillary computing device 20 may be more accurate by taking into account the semantic context associated with the messages that comprise the conversation. As shown in FIG. 1, the computer system 10 may also include a computer storage device 22, such as a server, a maintenance report database or the like, for storing the resulting conversation, such as a maintenance report generated by the conversation.

Referring now to FIG. 2, a block diagram representation of a computing device 30, such as the mediation computing device 18 or the ancillary computing device 20, in accordance with one embodiment of the present disclosure is provided. As shown, the computing device 30 may include a processing circuitry 32 and a memory device 34 that may cooperate in order to control the various functions described herein with respect to the computing device. The processing circuitry 32 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 32 is configured to execute instructions stored in the memory device 34 or otherwise accessible to the processing circuitry. These instructions, when executed by the processing circuitry 32, may cause the computing device to perform one or more of the functionalities of the computing device 30 as described herein. As such, whether configured by hardware or software methods, or by a combination thereof, the processing circuitry 32 may comprise an entity capable of performing operations according to embodiments of the present disclosure while configured accordingly. Thus, for example, when the processing circuitry 32 is embodied as an ASIC, FPGA or the like, the processing circuitry may comprise specifically configured hardware for conducting one or more operations described herein. Alternatively, as another example, when the processing circuitry 32 is embodied as an executor of instructions, such as may be stored in the memory device 34, the instructions may specifically configure the processing circuitry to perform one or more algorithms and operations described herein.

The memory device 34 may include, for example, volatile and/or non-volatile memory. The memory device 34 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory device 34 may comprise any non-transitory computer readable storage medium. The memory device 34 may be configured to store information, data, applications, instructions, or the like for enabling the computing device 30 to carry out various functions in accordance with example embodiments of the present disclosure. For example, in some example embodiments, the memory device 34 is configured to store program instructions for execution by the processing circuitry 32. As described herein, the memory device 34 may also be configured to store a conversation between two or more users, such as in the form of a maintenance report. In this regard, the memory device 34 of the mediation computing device 18 and/or the ancillary computing device 20 may be configured to store the conversation between two or more users.

The computing device 30 of FIG. 2 also includes a user interface 36 in communication with the processing circuitry 32 to receive an indication of a user input. In one embodiment, the user interface 36 may include, for example, a keyboard and/or a touch sensitive display, for receiving user input. The user interface 36 may also include a display 38 for presenting the conversation, such as a maintenance report, to the user, to maintenance technicians or to others.

The computing device 30 of FIG. 2 may also include a communication interface 38, such as a transmitter, a receiver, a transceiver, an antenna or the like, for facilitating communication between computing devices. In regards to the mediation computing device 18, although the user may provide the user input directly to the mediation computing device via a user interface 36 in one embodiment, the mediation computing device of another embodiment may include a communication interface 38 to facilitate communications with another computing device 12, 14 via which a user provides the user input. Additionally, the communication interface 38 of the mediation computing device 18 may facilitate communications between the mediation computing device and the ancillary computing device 20, such as to provide information regarding a conversation to the ancillary computing device in an instance in which the memory device 34 of the ancillary computing device is configured to store the conversation or to provide access to the ancillary computing device to a conversation stored in the memory device of the mediation computing device in an instance in which the memory device of the mediation computing device is configured to store the conversation. Correspondingly, the ancillary computing device 20 may include a communication interface 38 configured to facilitate communications with the mediation computing device 18, such as to receive information regarding a conversation from the mediation computing device in an instance in which the memory device 34 of the ancillary computing device is configured to store the conversation or to access a conversation stored in the memory device of the mediation computing device in an instance in which the memory device of the mediation computing device is configured to store the conversation.

In an embodiment in which the computer system 10 includes a computer storage device 22, such as a maintenance report database, a server or the like, that is external to and remote from the computing devices 12, 14 of the user, the mediation computing device 18 and the ancillary computing device 20, for storing the resulting conversation, such as a maintenance report, the communication interface 38 of the mediation computing device and/or the ancillary computing device may be configured to communicate with the computer storage device. As such the mediation computing device 18 and/or the ancillary computing device 20 may to access the resulting conversation stored by the computer storage device 22.

Referring now to FIG. 3, a method of mediating a conversation, such as a conversation that may culminate in the generation of a maintenance report, is illustrated. In this regard, the mediation computing device 18, such as the processing circuitry 32, the communication interface 38 or the like, may receive user input relating to a message that is being composed by the user. See block 40 of FIG. 3. In one embodiment, for example, the user input may relate to the maintenance of a system, such as an aircraft or a system onboard the aircraft.

Based upon the user input, the mediation computing device 18, such as the processing circuitry 32, may determine a candidate tag based upon and descriptive of the semantic context of the user input. See block 42 of FIG. 3. The determination of a candidate tag may be triggered in various manners. For example, the user input may indicate that tagging of the message should commence, such as by user input of # or one or more other predefined character(s). In one embodiment in which the user input indicates that the semantic tagging should commence, the user input may commence the semantic tagging with the processing circuitry of the mediation computing device 18 being configured to complete the tagging that was commenced by the user, such as by generating a candidate tag including at least a portion of the user input. Alternatively, the mediation computing device 18, such as the processing circuitry 32, may determine the candidate tag following entry of sufficient quantity of user input, such as a predetermined number of characters, which may allow the determination of the semantic context associated with user input.

The processing circuitry 32 of the mediation computing device 18 may determine the candidate tag based upon the semantic context of the user input in various manners. In one embodiment, the processing circuitry 32 may determine or otherwise be advised of the domain within which the user input is being provided. For example, in regards to user input of a message relating to the maintenance of a particular subsystem of an aircraft, the domain may be associated with maintenance operations relating to the particular subsystem of the aircraft. In this regard, in an instance in which the user input relates to an initial message in a conversation, the processing circuitry 32 may determine the candidate tag based upon the domain within which the user input is provided since the mediation computing device 18 may have no other semantic context via which to analyze the user input in regards to the determination of the candidate tag. For example, in the case of a discussion about a specific instance of an ongoing aircraft manufacturing process, the candidate tags may be generated based on the previous history of discussions about other instances of that process, e.g., the processing circuitry 32 may determine the process that is likely being discussed via inferences based on time, vocabulary, other factory system state, etc., and may generate candidate tags for the current discussion based on its records of previous discussions about the ongoing process. In another example involving a discussion about the design of a particular airplane system, the candidate tags may be generated by the processing circuitry 32 based on the design documents and discussions that already exist about the system or similar or related systems.

Additionally or alternatively, in an instance in which the user input is part of an ongoing conversation, the processing circuitry 32 may determine the candidate tag based upon the semantic context of the ongoing conversation and, in one embodiment, may also optionally take into account the domain within which the user input is provided. By taking into account the semantic context of the ongoing conversation, the processing circuitry 32 may more accurately determine the candidate tag. As an example of a first type of semantic analysis, the processing circuitry 32 may endeavor to understand the semantic meaning of utterances within the current conversation by mapping words to concepts given a semantic context, e.g., the specific aircraft manufacturing process discussed in the foregoing example. As an example of a second type of semantic analysis, the processing circuitry 32 may utilize statistical approaches to predict which tags will be useful in this current context by matching elements in the current conversation to elements within a large corpus of somewhat similar conversations, thereby suggesting tags for the current conversation that were previously found useful in statistically similar conversations. The processing circuitry 32 of one embodiment may utilize a hybrid or combination of the first and second types of semantic analysis since the two types complement each other. For example, in very narrow application domains, the processing circuitry 32 may utilize the first type of semantic analysis since the narrow nature of the domain makes understanding the mapping easier, while in more general domains, the processing circuitry may utilize the second type of semantic analysis since the statistical approaches may work better with the larger corpuses.

As shown in block 44 of FIG. 3, the mediation computing device 18, such as the processing circuitry 32, the communication interface 38 or the like, may provide an indication of the candidate tag to the computing device 12, 14 of the user. In this regard, the indication of the candidate tag may be provided to the user while the user is composing the message that includes the user input. The user then may accept the candidate tag, such as an instance in which the candidate tag accurately portrays the semantic context of the message that includes the user input, or may correct the candidate tag in an instance in which the candidate tag does not correctly or does not fully convey the semantic context of the message that will include the user input.

As such, the mediation computing device 18, such as the processing circuitry 32, the communication interface 38 or the like, may receive a response from the computing device 12, 14 of the user regarding the validity of the candidate tag with respect to the semantic context of the user input. See block 46 of FIG. 3. In this regard, the validity of the candidate tag may either indicate that the candidate tag is valid and that it accurately represents the semantic context of the message that will include the user input or that the candidate tag is invalid at an instance in which the candidate tag does not accurately or fully reflect the semantic context of the message that will include the user input. In one embodiment, in an instance in which the candidate tag was considered invalid, the response from the user may include a corrected tag based upon the semantic context of the message that will include the user input since the user may have believed that the candidate tag did not correctly or fully convey the semantic context of the message that will include the user input.

Following the semantic tagging of the messages of a conversation, the conversation may be stored, such as in a computer storage device 22. See block 48 of FIG. 3. Thereafter, an ancillary computing device 20, such as a search engine, a business process analysis engine or the like, may access the conversation that was stored and may have an improved contextualization of the context of the conversation and may, consequently, be able to analyze the conversation more accurately by consideration of the semantic tags associated with the messages. In one embodiment, for example, the conversation may generate a maintenance report that is stored and that may be subsequently analyzed to determine the maintenance history of a particular system, such as an aircraft, or to analyze a manner in which certain types of issues are resolved or the like. By reference to the semantic tags associated with the messages that comprise the maintenance report, an ancillary computing system 20 may more accurately analyze the maintenance report.

By suggesting a candidate tag based upon the semantic context of the user input that will form a portion of a message of a computer mediated conversation, the user that is part of the ongoing conversation may be more likely to include semantic tag since the user need only accept or correct a candidate tag and need not generate the candidate tag entirely himself or herself. Additionally, the user need not remember to add semantic tags, but, instead, the processing circuitry 32 of the mediation computing device 18 may suggest candidate tags, thereby causing the user to complete the semantic tagging process with less effort than if the user had to perform the entire tagging process himself or herself. Additionally, the use of candidate tags in regards to the semantic tagging of messages during a computer mediated conversation may facilitate the standardization of the semantic tags since the mediation computing device 18 may utilize more consistent tagging structures and methodology. By standardizing the semantic tagging, the ancillary computing device 20 may more readily comprehend the semantic tags and be able to utilize these semantic tags during a subsequent analysis of the computer mediated conversation.

Additionally, the user who is generating the message that includes the user input may also find the semantic tagging to be useful to their primary audience in that the semantic tags immediately indicate to the recipient of the message, that is, the primary audience, information regarding the context of the message. Thus, since the semantic tag may provide value to the primary audience of the message, the user who is generating the message may be more motivated to evaluate and accept or correct the candidate tags during the course of generating the message, thereby also providing subsequent benefit to an ancillary computing device 20 that analyzes a prior conversation.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of generating maintenance reports, the method comprising:
   in relation to a computer-mediated conversation between users of at least two computers, receiving user input relating to maintenance of a system;
   determining, with processing circuitry of a mediation computer, a candidate tag representative of a semantic context of the user input, wherein determining the candidate tag comprises:
      determining the candidate tag in an instance in which the user input relates to an initial message of the conversation based upon a domain within which the user input is provided, wherein the domain is selected from the group consisting of design, manufacturing and maintenance operations of the system within which the user input is provided; and
      determining the candidate tag in an instance in which the user input relates to an ongoing conversation based upon the semantic context of the conversation including a mapping of words in the conversation to concepts in the respective semantic context or matching of elements in the conversation to elements within a corpus of other conversations;
   providing an indication of the candidate tag to the user;
   receiving a response from the user regarding validity of the candidate tag with respect to the semantic context of the user input; and
   causing the maintenance report to be generated and stored with the maintenance report modified to include the computer-mediated conversation and the candidate tag associated therewith.

2. A method according to claim 1 wherein the indication of the candidate tag is provided to the user while composing a message that includes the user input.

3. A method according to claim 1 wherein receiving user input comprises receiving user input indicating commencement of tagging by the user, and wherein determining the candidate tag and providing the indication of the candidate tag are performed in response to the commencement of tagging by the user.

4. A method according to claim 3 wherein determining the candidate tag comprises completing the tagging commenced by the user.

5. A method according to claim 1 further comprising storing the maintenance report including the user input and an associated tag.

6. A mediation computer configured to generate maintenance reports, the mediation computer comprising:
   an interface configured to receive user input, in relation to a computer-mediated conversation between users of at least two computers, relating to maintenance of a system; and
   processing circuitry configured to determine a candidate tag representative of a semantic context of the user input, wherein the processing circuitry is configured to determine the candidate tag by: (i) determining the candidate tag in an instance in which the user input relates to an initial message of the conversation based upon a domain within which the user input is provided, wherein the domain is selected from the group consisting of design, manufacturing and maintenance operations of the system within which the user input is provided; and (ii) determining the candidate tag in an instance in which the user input relates to an ongoing conversation based upon the semantic context of the conversation including a mapping of words in the conversation to concepts in the respective semantic context or matching of elements in the conversation to elements within a corpus of other conversations,
   wherein the interface is further configured to provide an indication of the candidate tag to the user and to receive a response from the user regarding validity of the candidate tag with respect to the semantic context of the user input, and wherein the processing circuitry is further configured to cause the maintenance report to be generated and stored with the maintenance report modified to include the computer-mediated conversation and the candidate tag associated therewith.

7. A mediation computer according to claim 6 wherein the interface is configured to provide the indication of the candidate tag to the user while the user is composing a message that includes the user input.

8. A mediation computer according to claim 6 wherein the interface is configured to receive user input by receiving user input indicating commencement of tagging by the user, and wherein the processing circuitry is configured to determine the candidate tag and the interface is configured to provide the indication of the candidate tag in response to the commencement of tagging by the user.

9. A mediation computer according to claim 8 wherein the processing circuitry is configured to determine the candidate tag by completing the tagging commenced by the user.

10. A mediation computer according to claim 6 further comprising a memory configured to store the maintenance report including the user input and an associated tag.

11. A computer system comprising:
a mediation computer configured to mediate a conversation between users of at least two computers comprised of a plurality of messages, wherein the mediation computer is configured to receive user input comprising at least a portion of a message of the conversation, determine a candidate tag representative of a semantic context of the user input, provide an indication of the candidate tag to the user and receive a response from the user regarding validity of the candidate tag with respect to the semantic context of the user input, wherein the mediation computer is configured to determine the candidate tag by: (i) determining the candidate tag in an instance in which the user input relates to an initial message of the conversation based upon a domain within which the user input is provided, wherein the domain is selected from the group consisting of design, manufacturing and maintenance operations of the system within which the user input is provided; and (ii) determining the candidate tag in an instance in which the user input relates to an ongoing conversation based upon the semantic context of the conversation including a mapping of words in the conversation to concepts in the respective semantic context or matching of elements in the conversation to elements within a corpus of other conversations, wherein the mediation computer is further configured to cause the maintenance report to be generated and stored with the maintenance report modified to include the computer-mediated conversation and the candidate tag associated therewith; and
an ancillary computer configured to review the maintenance report including the conversation following completion of the conversation.

12. A computer system according to claim 11 wherein the ancillary computer comprises a search engine or a business process analysis engine.

13. A computer system according to claim 11 further comprising a memory configured to store the conversation including the plurality of messages and respective tags associated therewith, wherein the ancillary computer is configured to review the conversation stored by the memory.

14. A computer system according to claim 11 wherein the conversation comprises a maintenance report.

15. A computer system according to claim 11 wherein the mediation computer is configured to provide the indication of the candidate tag to the user while the user is composing the message that includes the user input.

16. A method according to claim 1 wherein determining the candidate tag comprises determining the candidate tag based upon a semantic meaning of utterances within the conversation.

17. A method according to claim 1 wherein determining the candidate tag comprises utilizing statistical approaches to predict the candidate tag that will be useful in the respective semantic context.

18. A mediation computer according to claim 6 wherein the processing circuitry is configured to determine the candidate tag by determining the candidate tag based upon a semantic meaning of utterances within the conversation.

19. A mediation computer according to claim 6 wherein the processing circuitry is configured to determine the candidate tag by utilizing statistical approaches to predict the candidate tag that will be useful in the respective semantic context.

20. A computer system according to claim 11 wherein the mediation computer is configured to determine the candidate tag by determining the candidate tag based upon a semantic meaning of utterances within the conversation or by utilizing statistical approaches to predict the candidate tag that will be useful in the respective semantic context.

21. A method according to claim 1 wherein determining the candidate tag in the instance in which the user input relates to an ongoing conversation comprises selecting determination of the candidate tag based upon either the mapping of words in the conversation to concepts in the respective semantic context or the matching of elements in the conversation to elements within a corpus of other conversations depending upon a size of the corpus.

22. A mediation computer according to claim 6 wherein the processing circuitry is configured to determine the candidate tag in the instance in which the user input relates to an ongoing conversation by selecting determination of the candidate tag based upon either the mapping of words in the conversation to concepts in the respective semantic context or the matching of elements in the conversation to elements within a corpus of other conversations depending upon a size of the corpus.

23. A computer system according to claim 11 wherein the mediation computer is configured to determine the candidate tag in the instance in which the user input relates to an ongoing conversation by selecting determination of the candidate tag based upon either the mapping of words in the conversation to concepts in the respective semantic context or the matching of elements in the conversation to elements within a corpus of other conversations depending upon a size of the corpus.

* * * * *